United States Patent
Thalheimer et al.

(10) Patent No.: US 11,254,425 B2
(45) Date of Patent: Feb. 22, 2022

(54) DIFFERENTIAL BLADE GEOMETRY FOR ROTOR ASSEMBLIES

(71) Applicant: The Aurora Flight Sciences Corporation, Manassas, VA (US)

(72) Inventors: William Thalheimer, Cambridge, MA (US); Andrew Mark Heafitz, Cambridge, MA (US)

(73) Assignee: Aurora Flight Sciences Corporation, Manassas, VA (US)

(*) Notice: Subject to any disclaimer, the term of this patent is extended or adjusted under 35 U.S.C. 154(b) by 151 days.

(21) Appl. No.: 16/595,169

(22) Filed: Oct. 7, 2019

(65) Prior Publication Data

US 2021/0101677 A1 Apr. 8, 2021

(51) Int. Cl.
*B64C 27/30* (2006.01)
*B64C 27/54* (2006.01)
*B64C 27/467* (2006.01)
*B64C 27/10* (2006.01)

(52) U.S. Cl.
CPC ............ *B64C 27/30* (2013.01); *B64C 27/10* (2013.01); *B64C 27/467* (2013.01); *B64C 27/54* (2013.01)

(58) Field of Classification Search
CPC ......... B64C 27/30; B64C 27/20; B64C 27/22; B64C 27/54; B64C 27/56; B64C 27/57; B64C 11/18; B64C 11/48; B64C 27/022; B64C 27/467
See application file for complete search history.

(56) References Cited

U.S. PATENT DOCUMENTS

| | | | | |
|---|---|---|---|---|
| 9,284,962 B2* | 3/2016 | Long | ................ | B64C 27/50 |
| 9,540,103 B2* | 1/2017 | Long | ................ | B64C 39/024 |
| 10,494,088 B1* | 12/2019 | Coralie | ................ | B64C 27/10 |
| 10,583,914 B2* | 3/2020 | Beckman | ................ | B64C 3/54 |
| 10,843,795 B2* | 11/2020 | Prager | ................ | B64C 11/28 |

* cited by examiner

*Primary Examiner* — Richard A Edgar
(74) *Attorney, Agent, or Firm* — Duft & Bornsen, PC

(57) ABSTRACT

Rotor assemblies for aircraft are described that include a plurality of blades that are disposed vertically on a common axis along different horizontal planes. When the rotor assemblies are free-wheeling, the blades form a vertically stacked configuration, and when the rotor assembly is driven in rotation to generate lift, the blades bloom out from the vertically stacked configuration. At least one of the blades in the rotor assembly has a blade geometry that is different with respect to other blades such that when the blades are vertically stacked and free-wheeling, the collective shape of the blades is aerodynamic in shape, based on the different blade geometry, that reduces aerodynamic drag on the rotor assembly.

20 Claims, 15 Drawing Sheets

DIFFERENTIAL BLADE GEOMETRY FOR ROTOR ASSEMBLIES

FIELD

This disclosure relates to the field of aircraft and, in particular, to aircraft that utilize rotors.

BACKGROUND

A type of aircraft that can take off, hover, and land vertically is referred to as a Vertical Take-off and Landing (VTOL) aircraft. A VTOL aircraft has one or more rotors that produce vertical lift. Some VTOL aircraft also have fixed-wings that generate lift when the aircraft is propelled forward by a propeller, a jet engine, etc. When these fixed-wing aircraft convert from vertical flight to horizontal, or wing-borne flight, the rotors are not driven in rotation. One problem is that the rotors can produce drag when they free-wheel, which hinders the efficiency of wing-borne flight.

SUMMARY

Rotor assemblies for aircraft are described that include a plurality of blades that are disposed vertically on a common axis along different horizontal planes. When the rotor assemblies are free-wheeling, the blades form a vertically stacked configuration, and when the rotor assembly is driven in rotation to generate lift, the blades bloom out from the vertically stacked configuration. At least one of the blades in the rotor assembly has a blade geometry that is different with respect to other blades such that when the blades are vertically stacked and free-wheeling, they align with the freestream airflow such that the aerodynamic drag on the rotor assembly is reduced.

One embodiment comprises a method of operating a rotor assembly for aircraft. The method comprises operating the rotor assembly in a free-wheeling state, the rotor assembly comprising a plurality of blades vertically disposed on a common axis along different horizontal planes, wherein at least one of the blades has a different blade geometry with respect to another of the blades. The method further comprises vertically aligning the blades with each other such that a collective shape of the blades is aerodynamic in shape, based on the different blade geometry, that reduces aerodynamic drag on the rotor assembly.

Another embodiment comprises a rotor assembly for aircraft. The rotor assembly comprises a plurality of blades disposed vertically on a common axis along different horizontal planes, where the blades vertically align with each other when the rotor assembly is free-wheeling, and rotate on the common axis out of alignment with each other when the rotor assembly is driven in rotation. At least one of the blades has a different blade geometry with respect to another of the blades such that a collective shape of the blades is aerodynamic in shape, based on the different blade geometry, that reduces aerodynamic drag on the rotor assembly when the blades are vertically aligned with each other.

Another embodiment comprises an aircraft. The aircraft includes at least one rotor assembly that provides lift for the aircraft. The at least one rotor assembly includes a first blade and a second blade disposed vertically on a common axis along different horizontal planes. The first blade and the second blade form a vertically stacked configuration when the rotor assembly is free-wheeling, and bloom out of the vertically stacked configuration when the rotor assembly is driven in rotation to generate the lift. The first blade has a different blade geometry with respect to the second blade that reduces a spacing between corresponding edges of the first blade and the second blade when the first blade and the second blade form the vertically stacked configuration.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
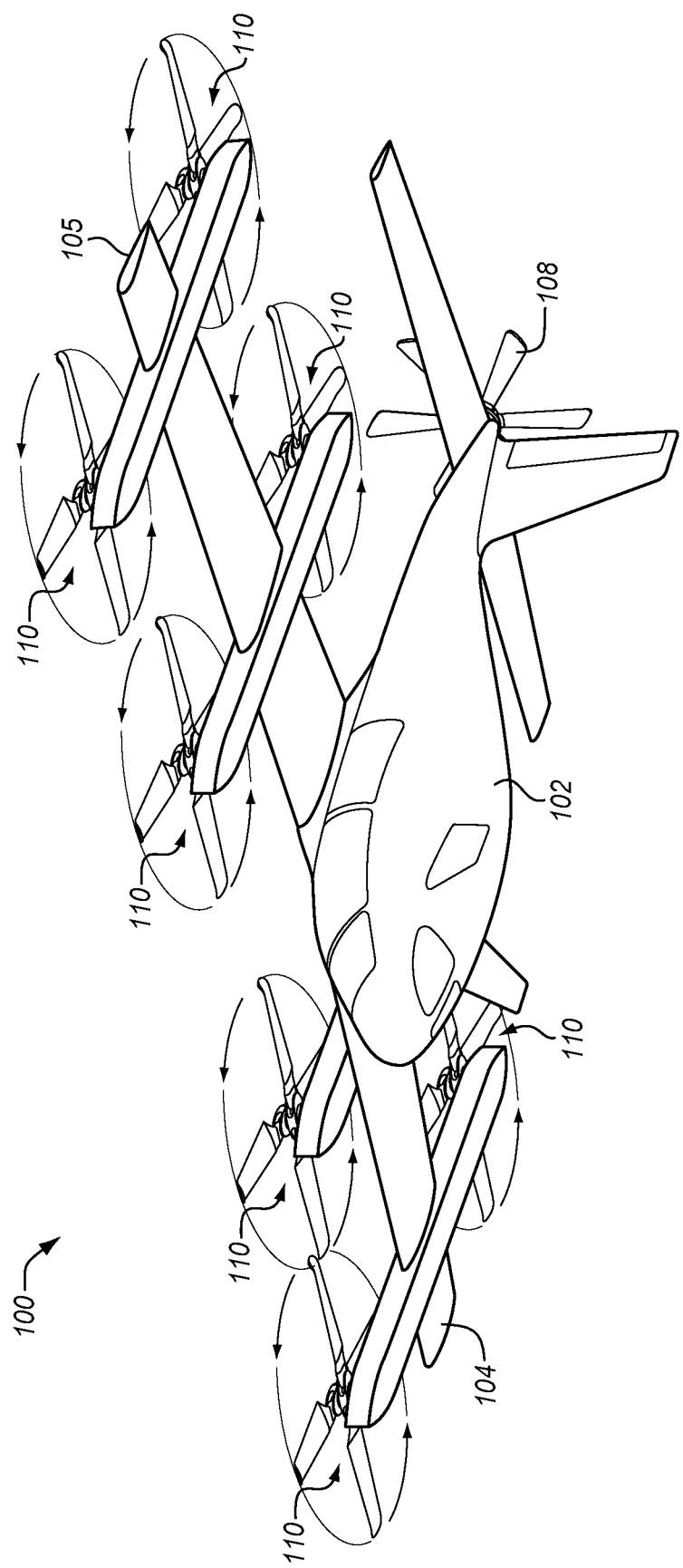
FIG. 1 is an isometric view of an aircraft in an illustrative embodiment.

FIG. 1 is an isometric view of an aircraft 100 in an illustrative embodiment. Aircraft 100 may be a manned aircraft that is flown by one or more pilots, or may be an unmanned aircraft (e.g., a drone). The structure of aircraft 100 is merely provided as an example, and the concepts described herein apply to any aircraft. In this example, aircraft 100 includes a fuselage 102, and wings 104-105 extending from opposite sides of fuselage 102 to define a support plane for horizontal or wing-borne flight. Aircraft 100 also includes a propeller 108 that provides thrust for wing-borne flight, although other types of engines are used to generate thrust in other embodiments.

To provide vertical flight (i.e., take-off, hover, and landing), aircraft 100 includes one or more rotor assemblies 110. The number and locations of the rotor assemblies 110 shown in FIG. 1 are merely for example, and vary as desired. Further, although rotor assemblies 110 are illustrated as including four blades each, rotor assemblies 110 include a different number of blades in other embodiments.

As rotor assemblies 110 spin via a motor, rotor assemblies 110 provide vertical lift so that aircraft 100 is able to take-off, hover, and land. Rotor assemblies 110 in FIG. 1 are illustrated in a deployed position.

Figure 2:
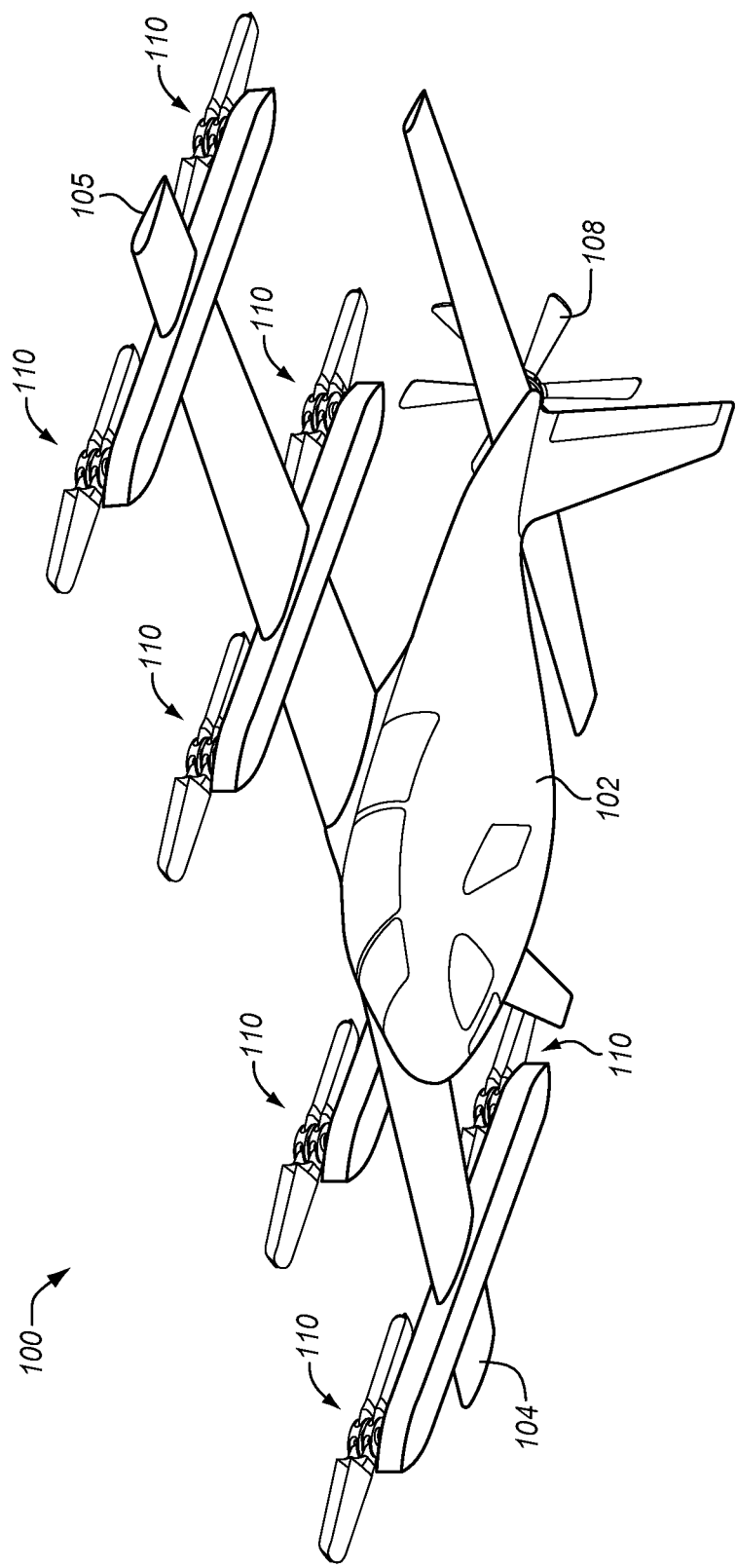
FIG. 2 is an isometric view of the aircraft of FIG. 1 during a cruise phase in an illustrative embodiment.

FIG. 2 is an isometric view of aircraft 100 during a cruise phase in an illustrative embodiment. During this phase, a propeller 108 is operating and serves as the thrust producer for aircraft 100 to move horizontally. In FIG. 2, when aircraft 100 transitions from vertical flight to wing-borne flight, the blades of rotor assemblies 110 are not operating and may form a vertically stacked configuration as illustrated in FIG. 2. Although FIG. 2 illustrates rotor assemblies 110 in a particular rotational orientation during the cruise phase, rotor assemblies 110 have different rotational orientations in other embodiments. In the embodiments described herein, one or more of the blades for rotor assemblies 110 has a distinct blade geometry with respect to other blades. Consequently, when stacked, the collective shape formed by the blades on rotor assembly 110 reduces an aerodynamic drag on aircraft 100.

Figure 3:
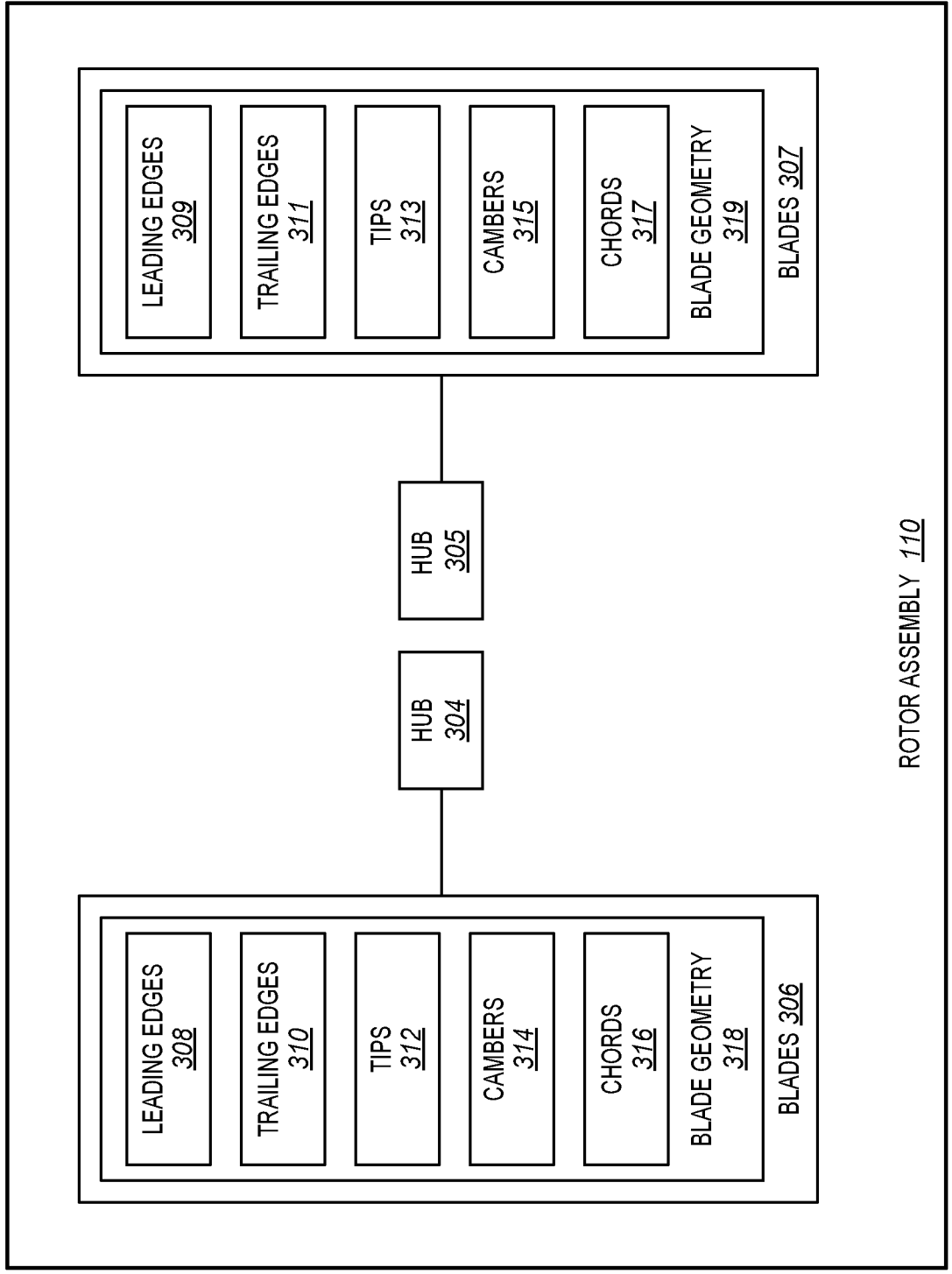
FIG. 3 is a block diagram of a rotor assembly in an illustrative embodiment.

FIG. 3 is a block diagram of rotor assembly 110 in an illustrative embodiment. In this embodiment, rotor assembly 110 includes a plurality of blades 306-307 that are mechanically coupled to one or more hubs 304-305. Blades 306-307 form an airfoil that generates lift for aircraft 100 when hubs 304-305 are driven in rotation.

In this embodiment, one or more of blades 306 have a blade geometry 318 which is different with respect to blade geometry 319 of blades 307. The distinct blade geometries operate to passively generate a more aerodynamic shape when blades 306-307 are vertically aligned with each other (e.g., blades 306-307 are vertically stacked) as compared to the case where blades 306-307 have the same geometries. This collective aerodynamic shape allows blades 306-307, when aligned during a cruise phase for aircraft 100 (e.g., rotor assemblies 110 are free-wheeling), to generate less drag. This improves the performance of aircraft 100 during cruise.

In one embodiment, the different blade geometries 318-319 place leading edges 308-309 of blades 306-307 into a more aerodynamic shape when blades 306-307 are vertically aligned with each other that reduces the aerodynamic drag on rotor assembly 110. A leading edge is the portion of blades 306-307 that contacts the air first when rotor assembly 110 is driven in rotation. Such a modification may include, for example, modifying leading edges 308 of blades 306 and/or modifying leading edges 309 of blades 307 such that a spacing between leading edges 308-309 is reduced when blades 306-307 are vertically aligned. The reduced spacing collectively generates a more aerodynamic shape when an airflow is applied to leading edges 308-309 and when blades 306-307 form a stacked configuration.

In another embodiment, the different blade geometries 318-319 place trailing edges 310-311 of blades 306-307 into a more aerodynamic shape when blades 306-307 are vertically aligned with each other that reduces the aerodynamic drag on rotor assembly 110. A trailing edge is the portion of blades 306-307 that contacts the air last when rotor assembly 110 is driven in rotation. Such a modification may include, for example, modifying trailing edges 310 of blades 306 and/or modifying trailing edges 311 of blades 307 such that a spacing between trailing edges 310-311 is reduced when blades 306-307 are vertically aligned. The reduced spacing collectively generates a more aerodynamic shape when an airflow is applied to trailing edges 310-311 and when blades 306-307 form a stacked configuration.

In another embodiment, the different blade geometries 318-319 place blade tips 312-313 in a more aerodynamic shape when blades 306-307 are vertically aligned that reduces the aerodynamic drag on rotor assembly 110. A tip is the portion of blades 306-307 that is distal from their corresponding hubs 304-305. Such a modification may include, for example, modifying blade tips 312 of blades 306 and/or modifying blade tips 313 of blades 307 such that a spacing between blade tips 312-313 is reduced when blades 306-307 are vertically aligned. The reduced spacing collectively generates a more aerodynamic shape when an airflow is applied to blade tips 312-313 and when blades 306-307 form a stacked configuration.

In another embodiment, the different blade geometries 318-319 generate cambers 314 of blades 306 that are different than cambers 315 of blades 307. The difference in cambers 314-315 collectively generates a more aerodynamic shape when blades 306-307 are vertically aligned. A camber is the asymmetry between two acting surfaces of blades 306-307 when blades 306-307 are vertically stacked. For example, cambers 314 of blades 306 may be made more convex than cambers 315 of blades 307 (when blades 306 are above blades 307 in rotor assembly 110), which operates to blend together leading edges 308-309 and trailing edges 310-311 to form a more aerodynamic shape for rotor assembly 110 when blades 306-307 form a stacked configuration.

In another embodiment, the different blade geometries 318-319 generates chords 316 of blades 306 that are different than chords 317 of blades 307. The difference in chords 316-317 collectively generates a more aerodynamic shape when blades 306-307 are vertically aligned (i.e., stacked). A chord is the straight-line distance between the leading edge and a trailing edge of an airfoil. For example, chords 316 of blades 306 may be shorter than chords 317 of blades 307 (when blades 306 are above blades 307 in rotor assembly 110), which operates to blend together leading edges 308-309 and trailing edges 310-311 to collectively form a more aerodynamic shape for rotor assembly 110 when blades 306-307 form a stacked configuration.

Although blade geometries 318-319 have been described individually with respect to the aerodynamic shape of rotor assembly 110 when blades 306-307 are vertically aligned with each other, various combinations of blade geometries 318-319 may be used to achieve the same result. For instance, a top blade in rotor assembly 110 may have a higher camber and a shorter chord than a bottom blade in rotor assembly 110, when blades 306-307 are vertically aligned with each other to collectively form a stacked configuration.

Figure 4:
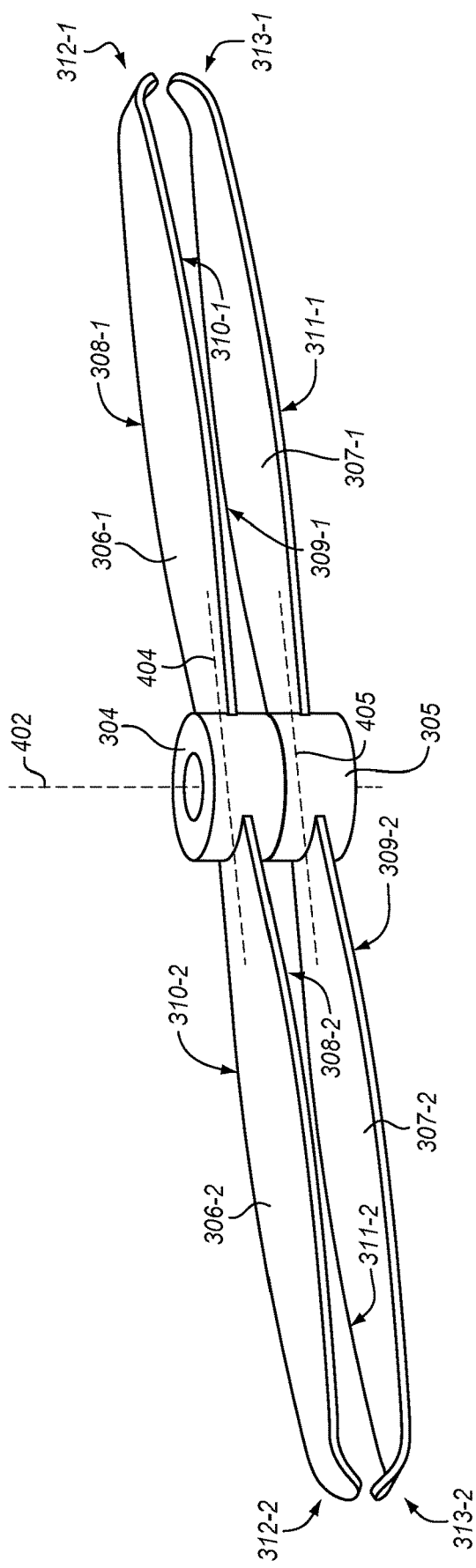
FIG. 4 is an isometric view of a rotor assembly with blades that are vertically aligned in an illustrative embodiment
Figure 5:
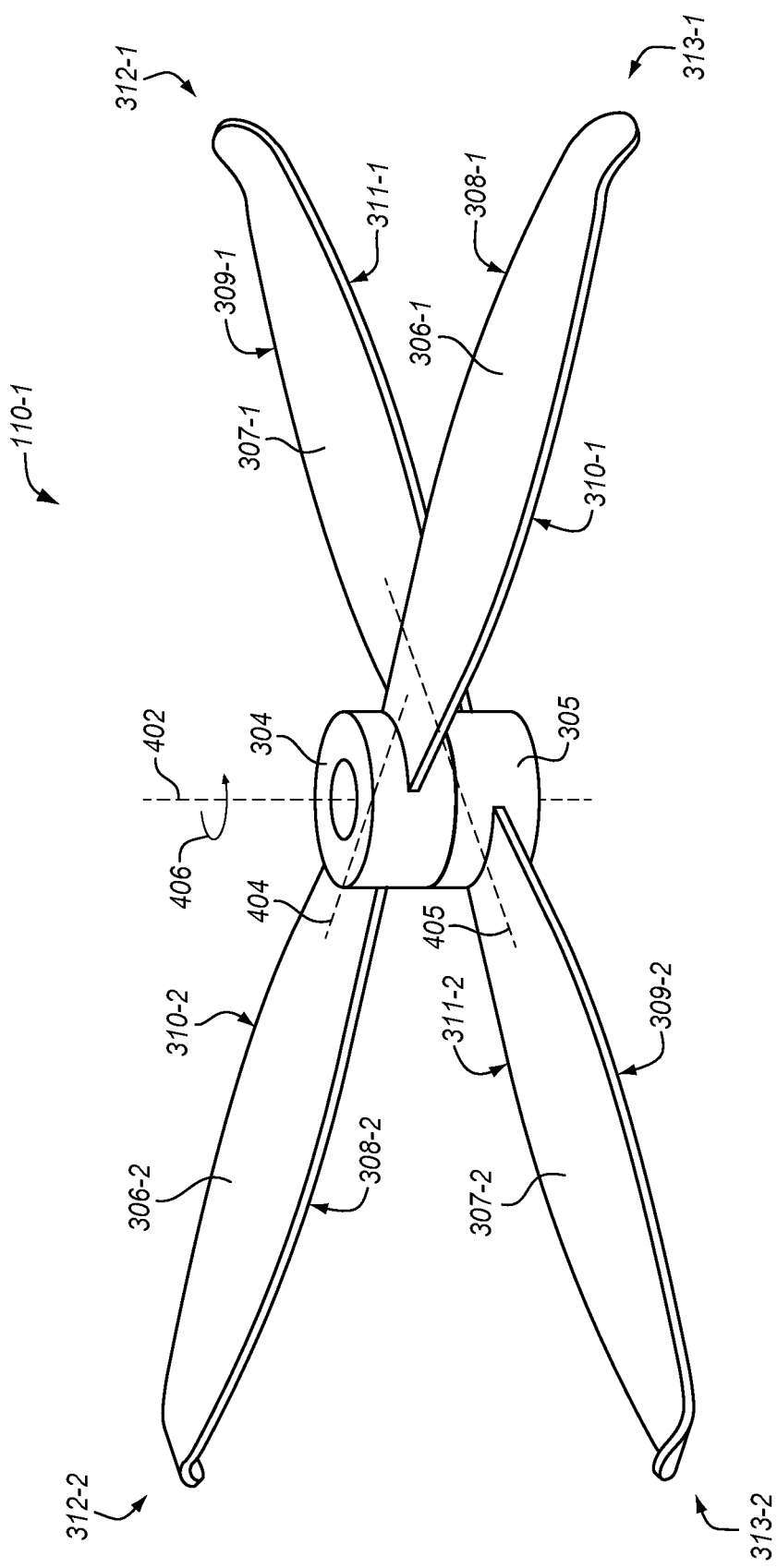
FIG. 5 is an isometric view of the rotor assembly of FIG. 4 with blades that are deployed in an illustrative embodiment.

FIGS. 4-5 are isometric views of a rotor assembly 110-1 in an illustrative embodiment. FIG. 4 illustrates blades 306-307 vertically aligned with each other when rotor assembly 110-1 is free-wheeling, and FIG. 5 illustrates blades 306-307 in a deployed configuration when rotor assembly 110-1 is driven in rotation to generate lift. In this embodiment, blades 306-307 are disposed vertically on a common axis 402 along different horizontal planes 404-405, respectively.

In this embodiment, hub 304 includes blade 306-1 and blade 306-2, which extend radially from hub 304. Blade 306-1 includes a leading edge blade geometry 318 at leading edge 308-1, a trailing edge blade geometry 318 at trailing edge 310-1, and a blade tip blade geometry 318 at blade tip 312-1 (e.g., rotor assembly 110-1 rotates in the direction of arrow 406 in this embodiment shown in FIG. 5). Blade 306-2 includes a leading edge blade geometry 318 at leading edge 308-2, a trailing edge blade geometry 318 at trailing edge 310-2, and a blade tip blade geometry 318 at blade tip 312-2. Hub 305 includes blade 307-1 and blade 307-2, which extend radially from hub 305. Blade 307-1 includes a leading edge blade geometry 319 at leading edge 309-1, a trailing edge blade geometry 319 at trailing edge 311-1, and a blade tip blade geometry 319 at blade tip 313-1. Blade 307-2 includes a leading edge blade geometry 319 at leading edge 309-2, a trailing edge blade geometry 319 at trailing edge 311-2, and a blade tip blade geometry 319 at blade tip 313-2. In this embodiment, blade tips 312 curve down and blade tips 313 curve up, which results in blade geometry 318 for blades 306 being different than blade geometry 319 for blades 307. When blades 306-307 are vertically aligned or stacked as illustrated in FIG. 4, the reduction in spacing between blade tips 312-313 due to the curves in blade tips 312-313 generates a more aerodynamic shape, collectively, when blades 306-307 are vertically aligned, which reduces the drag generated by rotor assembly 110-1. In this embodiment, blade tip 313-1 is subjacent to blade tip 312-1, and blade tip 313-2 is subjacent to blade tip 312-2.

When operational, air flow over blades 306-307 can scissor blades 306-307 into a deployed configuration. For example, as blades 306-307 are driven in rotation, differential drag induced on blades 306-307 based on their different blade geometries may cause one of blades 306-307 to rotate slower or faster than another of the blades 306-307, thereby causing blades 306-307 to deploy. When free-wheeling/idle, geometric differences in blades 306-307 cause them to align in a stacked configuration and a collective geometry formed therewith produces less drag with respect to a stack of blades with the same geometry. For example, as blades 306-307 are free-wheeling/idle, differential drag induced on blades 306-307 based on their different blade geometries may cause one of blades 306-307 to pivot or rotate with respect to another of blades 306-307, thereby causing blades 306-307 to align in a stacked configuration.

Although the differences in blade geometries 318-319 for blades 306-307 has been described with respect to blade tips 312-313, other types of differences in blade geometries 318-319 include geometry changes to leading edge 308 and/or leading edge 309 (e.g., leading edge 308 and/or leading edge 309 may curve towards the other, with leading edge 309 subjacent to leading edge 308 in this embodiment), geometry changes to trailing edge 310 or trailing edge 311 (e.g., trailing edge 310 and/or trailing edge 311 may curve towards the other, with trailing edge 311 subjacent to trailing edge 310 in this embodiment), geometry changes to cambers 314-315 of blades 306-307 and/or geometry changes to chords 316-317 of blades 306-307.

Figure 6:
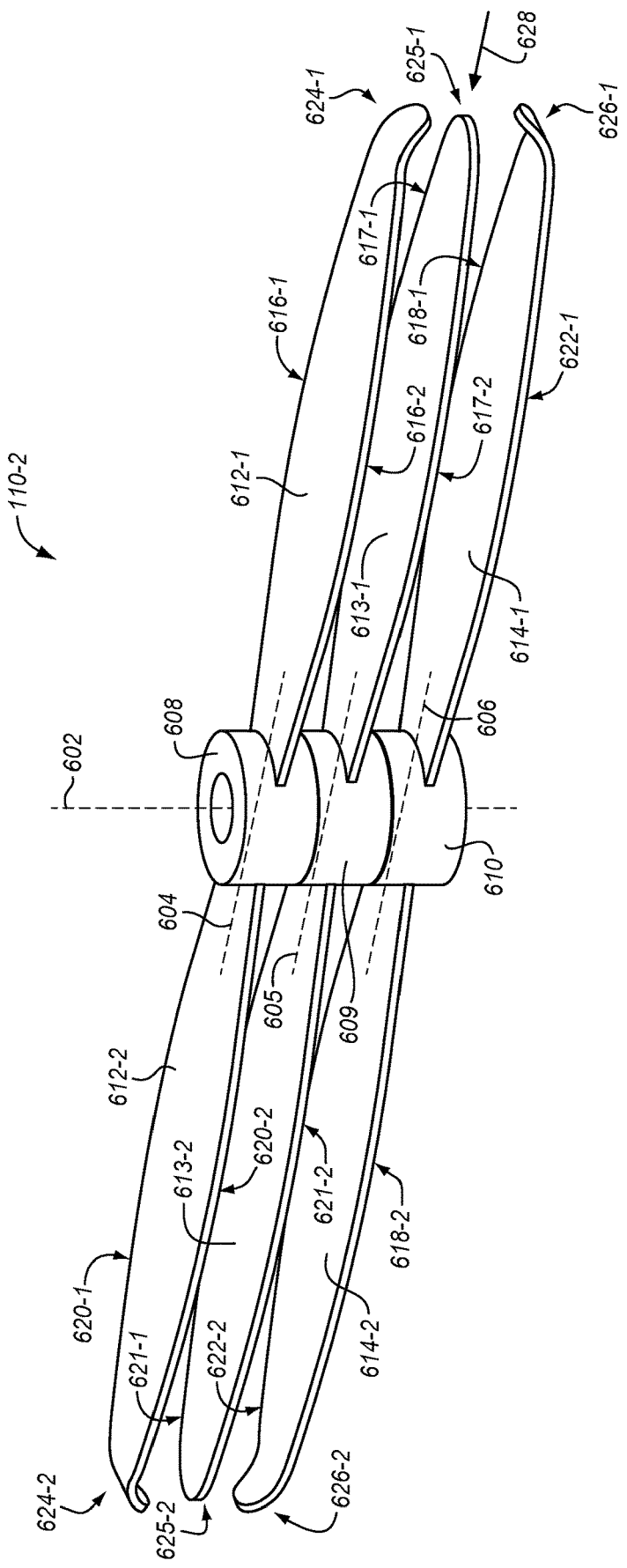
FIGS. 6-8 are isometric views of a rotor assembly with vertically aligned blades in various illustrative embodiments.

FIG. 6 is an isometric view of a rotor assembly 110-2 in another illustrative embodiment. FIG. 6 illustrates blades 612-614 vertically aligned with each other when rotor assembly 110-2 is free-wheeling. In this embodiment, blades 612-614 are disposed vertically on common axis 602 along different horizontal planes 604-606, respectively.

In this embodiment, a first hub 608 of rotor assembly 110-2 includes blade 612-1 and blade 612-2, which extend radially from first hub 608. Blade 612-1 includes a leading edge 616-1, a trailing edge 616-2, and a blade tip 624-1. Blade 612-2 includes a leading edge 620-2, a trailing edge 620-1 and a blade tip 624-2.

A second hub 609 of rotor assembly 110-2 includes blade 613-1 and blade 613-2, which extend radially from second hub 609. Blade 613-1 includes a leading edge 617-1 subjacent to leading edge 616-1, a trailing edge 617-2 subjacent to trailing edge 616-2, and a blade tip 625-1 subjacent to blade tip 624-1. Blade 613-2 includes a leading edge 621-2 subjacent to leading edge 620-2, a trailing edge 621-1 subjacent to trailing edge 620-1, and a blade tip 625-2 subjacent to blade tip 624-2.

A third hub 610 of rotor assembly 110-2 includes blade 614-1 and blade 614-2, which extend radially from third hub 610. Blade 614-1 includes a leading edge 618-1 subjacent to leading edge 617-1, a trailing edge 622-1 subjacent to trailing edge 617-2, and a blade tip 626-1 subjacent to blade tip 625-1. Blade 614-2 includes a leading edge 618-2 subjacent to leading edge 621-2, a trailing edge 622-2 subjacent to trailing edge 621-1, and a blade tip 626-2 subjacent to blade tip 625-2.

In this embodiment, blade tips 624 of blades 612 and blade tips 626 of blades 614 have a geometry that forms a more aerodynamic shape when blades 612-614 are vertically aligned with each other. In particular, blade tips 624 of blades 612 (located at the top of rotor assembly 110-2) curve towards blade tips 625 of blades 613 (located in the middle of rotor assembly 110-2), and blade tips 626 of blades 614 (located at the bottom of rotor assembly 110-2) curve towards blade tips 625 of blades 613 (located in the middle or rotor assembly 110-2). In the vertically aligned or stacked configuration illustrated in FIG. 6, rotor assembly 110-2 collectively forms a more aerodynamic shape that reduces the aerodynamic drag on rotor assembly 110-2 in the presence of airflow 628, which improves the performance of aircraft 100 when rotor assembly 110-2 is free-wheeling.

Figure 7:
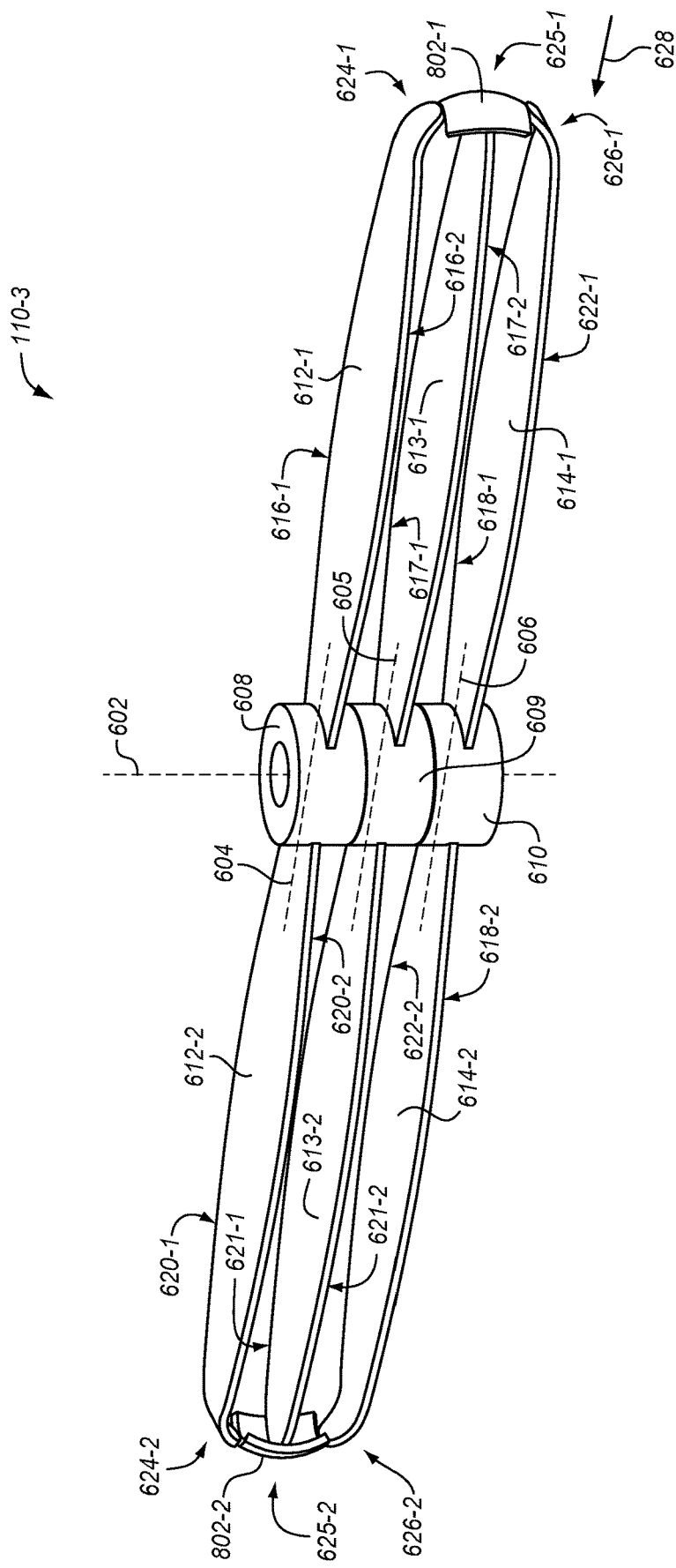

FIG. 7 is an isometric view of a rotor assembly 110-3 in another illustrative embodiment. In this embodiment, blade tip 624-1 and blade tip 626-1 curve towards blade tip 625-1, which has an intermediate blade geometry 802-1 that blends with blade tip 624-1 and blade tip 626-1. Blade tip 624-2 and blade tip 626-2 curve towards blade tip 625-2, which has an intermediate blade geometry 802-2 that blends with blade tip 624-2 and blade tip 626-2.

Figure 8:
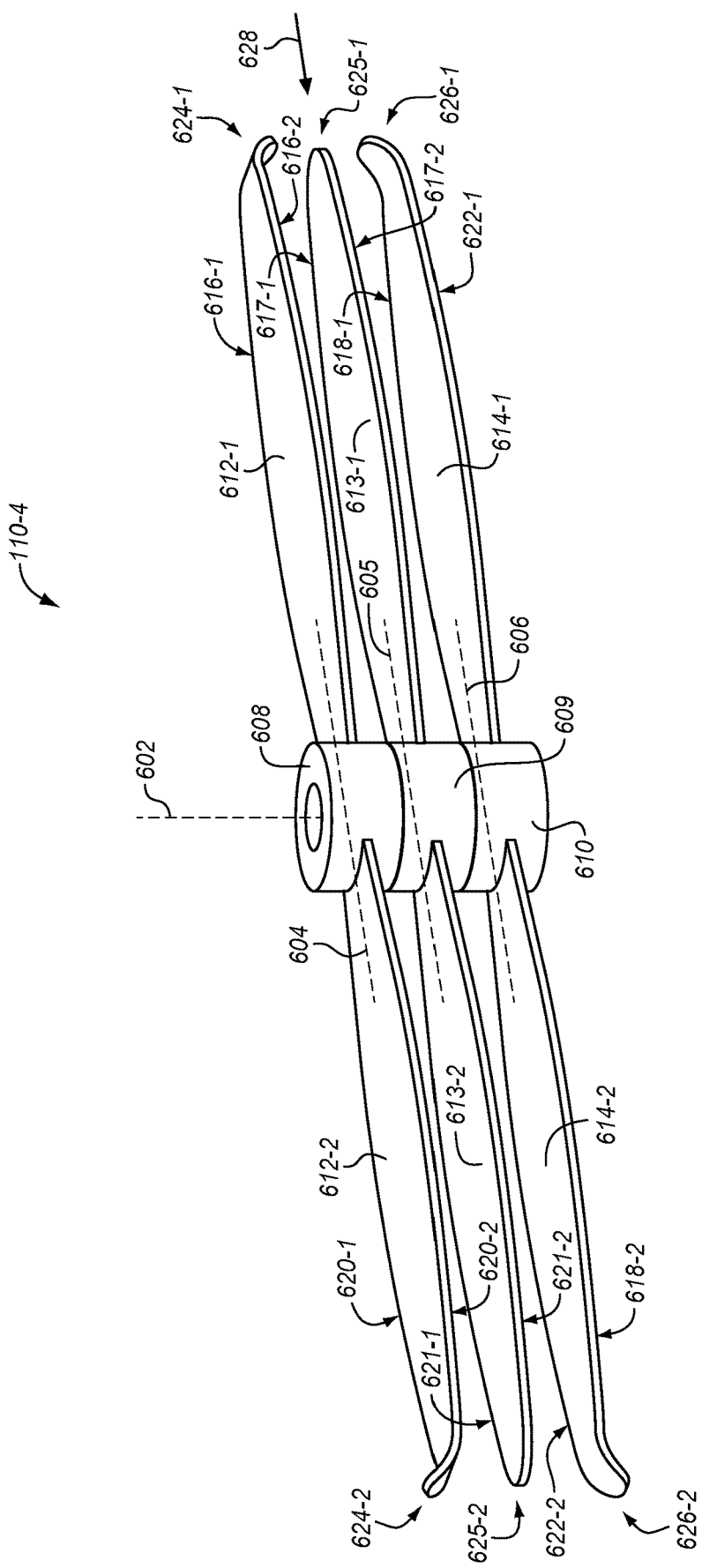

FIG. 8 is an isometric view of a rotor assembly 110-4 in another illustrative embodiment. In this embodiment, blade tip 624-1 and blade tip 626-1 curve towards blade tip 625-1, and blade tip 624-2 and blade tip 626-2 curve away from blade tip 625-2. Blade tip 624-2 and blade tip 626-2 in this embodiment orient rotor assembly 110-4 in the presence of airflow 628 when rotor assembly 110-4 is free-wheeling and blades 612-614 are vertically aligned.

Figure 9:
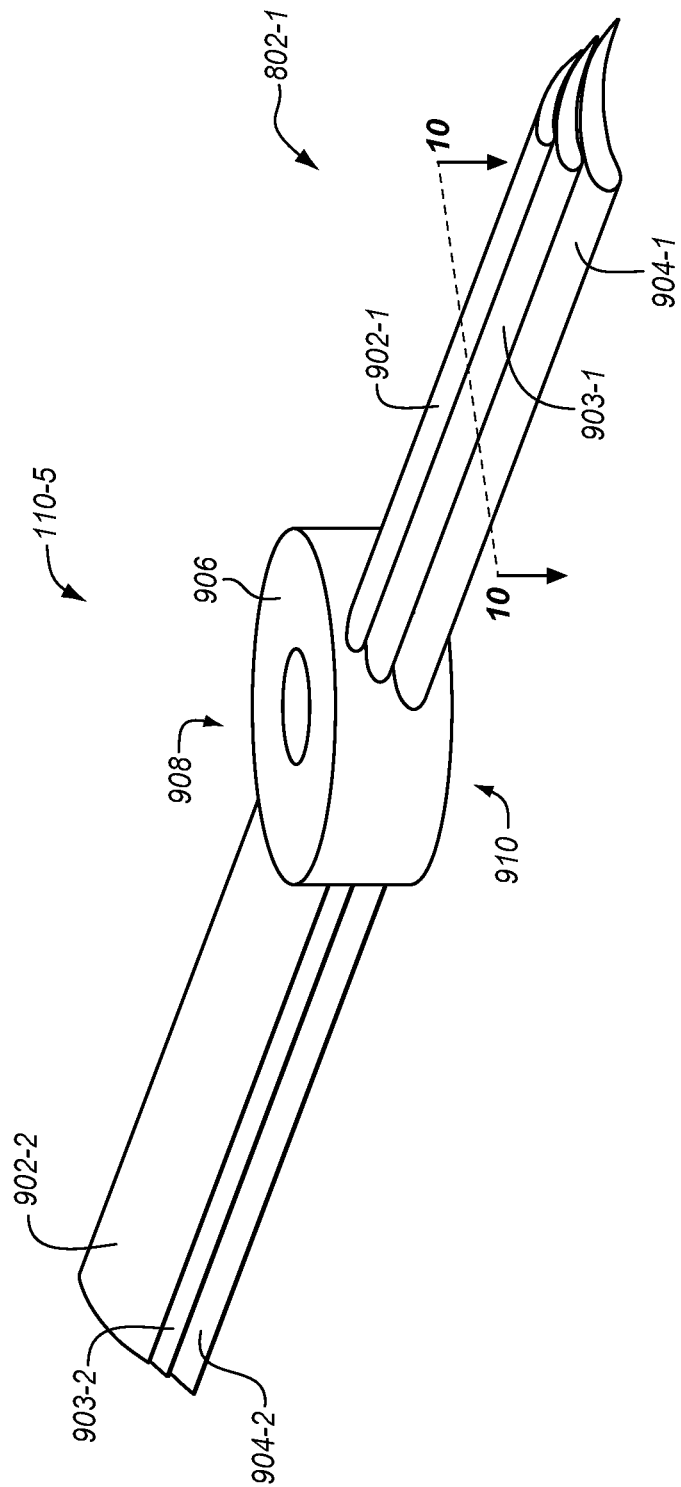
FIG. 9 is an isometric view of a rotor assembly in another illustrative embodiment.

FIG. 9 is an isometric view of a rotor assembly 110-5 in another illustrative embodiment. In this embodiment, rotor assembly 110-5 includes a plurality of blades 902-904 that radiate from a hub 906. In this view, blades 902-904 are vertically aligned or stacked, which would be the configuration formed when rotor assembly 110-5 is free-wheeling.

In this embodiment, blades 902 (i.e., blade 902-1 and blade 902-2) are proximate to a top 908 of hub 906, blades 904 (i.e., blade 904-1 and blade 904-2) are proximate to a bottom 910 of hub 906, and blades 903 (i.e., blade 903-1 and blade 903-2) are disposed between blades 902 and blades 904.

Another way of making rotor assembly 110 more aerodynamic in cruise is to bring the leading edges and the trailing edges of the vertically aligned blades together. A lift producing device of constant span (e.g., a blade) can vary its thrust with modifications to camber and chord. A blade of high camber and low chord will produce the same thrust as a blade with low camber and high chord. For example, one way of bringing the leading edges and the trailing edges of the vertically aligned blades together in a 2-blade stack is to configure the top blade to have a higher camber and a shorter chord than the bottom blade, while still maintaining the same thrust in the top blade as the bottom blade to ensure that the assembly has balanced thrust when driven in rotation.

Figure 10:
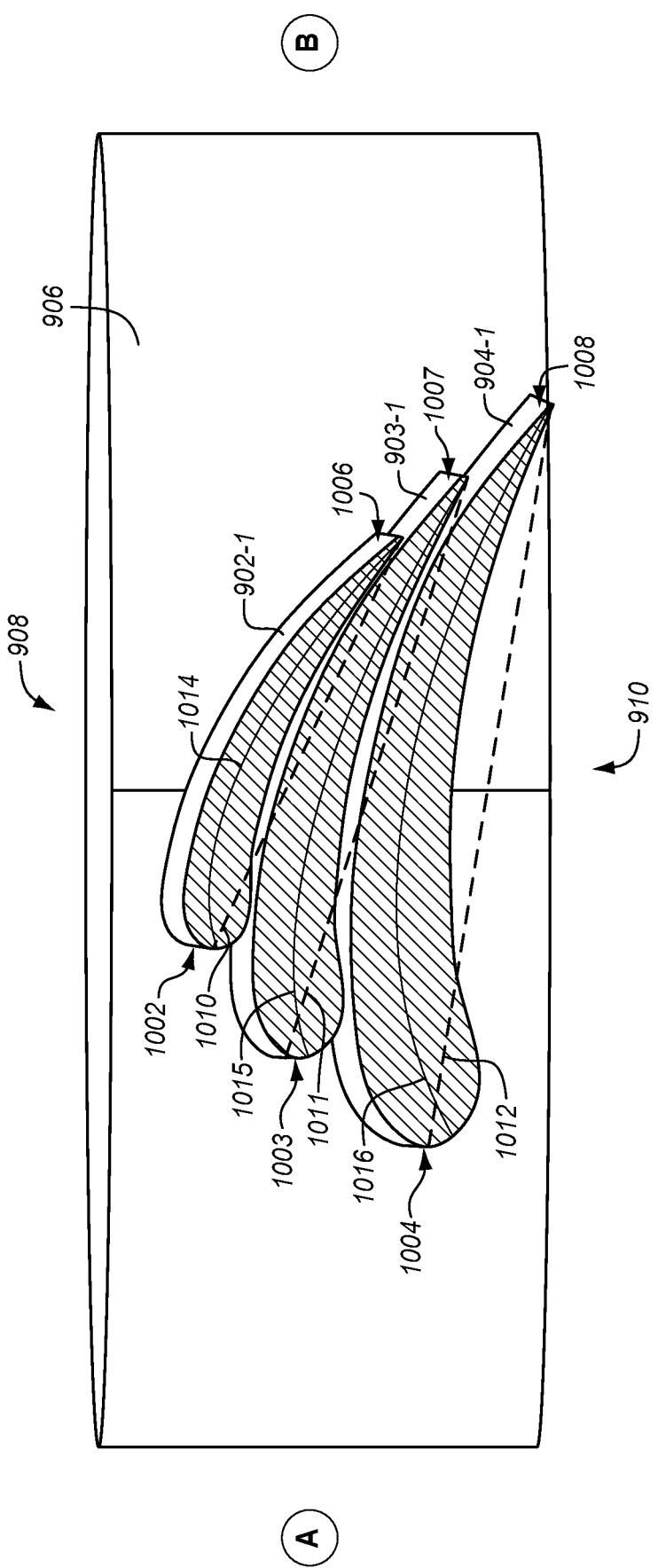
FIG. 10 is a cross-sectional view of the rotor assembly of FIG. 10 in an illustrative embodiment.

FIG. 10 is a cross-section of rotor assembly 110-5 of FIG. 9 along cut lines 10-10 in an illustrative embodiment. In FIG. 10, the chord and camber of blades 902-904 are more clearly identifiable. In particular, blade 902-1 has a chord 1010 and a camber 1014, blade 903-1 has a chord 1011 and a camber 1015, and blade 904-1 has a chord 1012 and a camber 1016. In this embodiment, camber 1014 of blade 902-1 is higher than either camber 1015 of blade 903-1 or camber 1016 of blade 904-1. Further, chord 1010 of blade 902-1 is less than either chord 1011 of blade 903-1 or chord 1012 of blade 904-1. Further in this embodiment, camber 1016 of blade 904-1 is lower than either camber 1014 of blade 902-1 or camber 1015 of blade 903-1. Chord 1012 of blade 904-1 is more than either chord 1010 of blade 902-1 or chord 1011 of blade 903-1.

Figure 11:
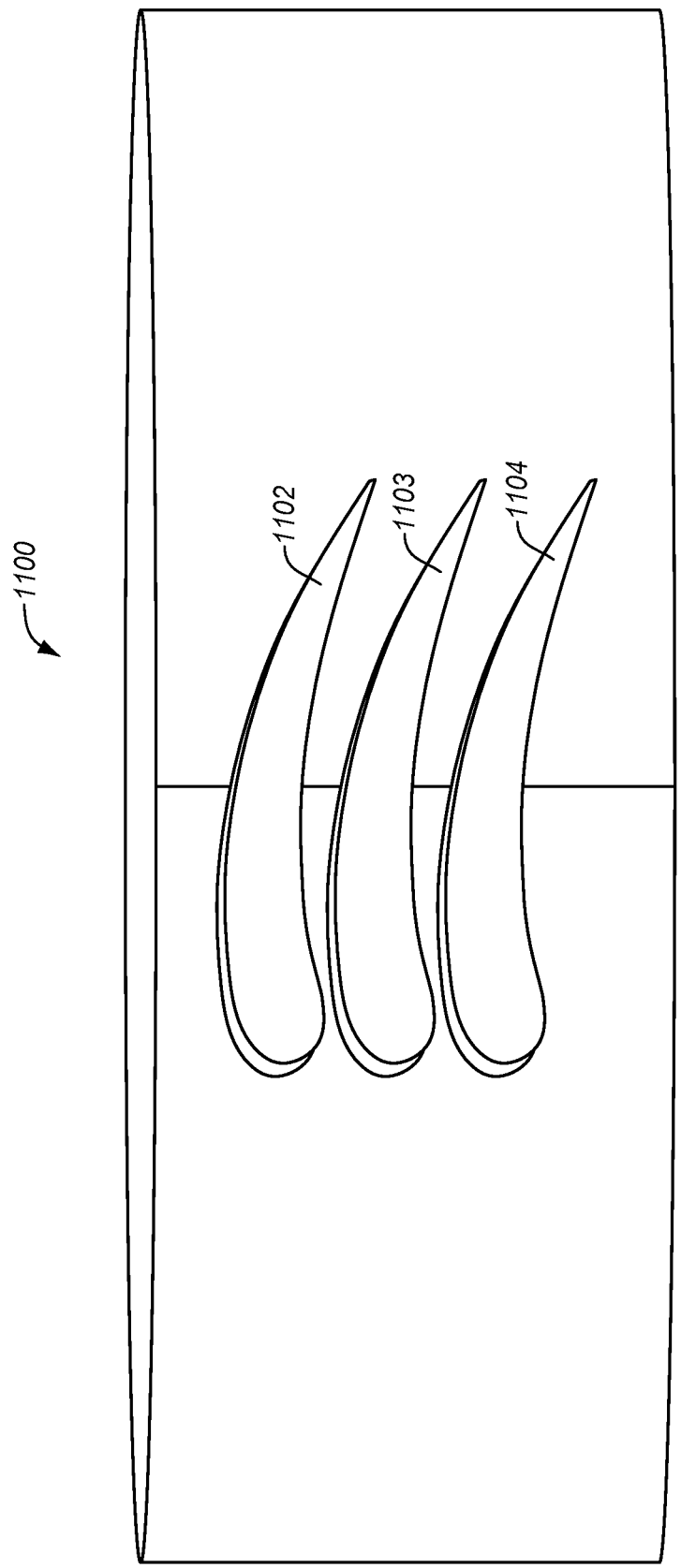
FIG. 11 is a cross-sectional view of a plurality of stacked blades that share a common chord and camber in an illustrative embodiment.

The configuration illustrated in FIG. 10 allows the leading edges 1002-1004 and the trailing edges 1006-1008 of blades 902-904 to blend together to collectively form a more aerodynamic configuration, while ensuring that each of blades 902-904 creates equal lift (which is important for balance while rotor assembly 110-5 is driven in rotation). In particular, leading edge 1002 and trailing edge 1006 of blade 902-1 blends in with leading edge 1003 and trailing edge 1007 of blade 903-1, and in turn, leading edge 1003 and trailing edge 1007 of blade 903-1 blends in with leading edge 1004 and trailing edge 1008 of blade 904-1. The configuration illustrated in FIG. 10 has an advantage in that more lift is provided in the stacked configuration illustrated in FIG. 9 as compared to the configuration 1100 of blades 1102-1104 illustrated in FIG. 11, which illustrates blades 1102-1104 that share the same chord and camber.

In some embodiments, an airflow acting on blades 902-904 causes blades 902-904 to deploy out of the stacked configuration illustrated in FIG. 10. In one example, blade 902-1 is fixed, blade 903-1 moves towards position A, and blade 904-1 moves towards position A at a faster rate than blade 903-1. In another example, blade 902-1 moves towards position B, blade 903-1 is fixed, and blade 904-1 moves towards position A. In another example, blade 902-1 moves towards position B, blade 903-1 moves towards B at a slower rate than blade 902-1, and blade 904-1 is fixed.

Figure 12:
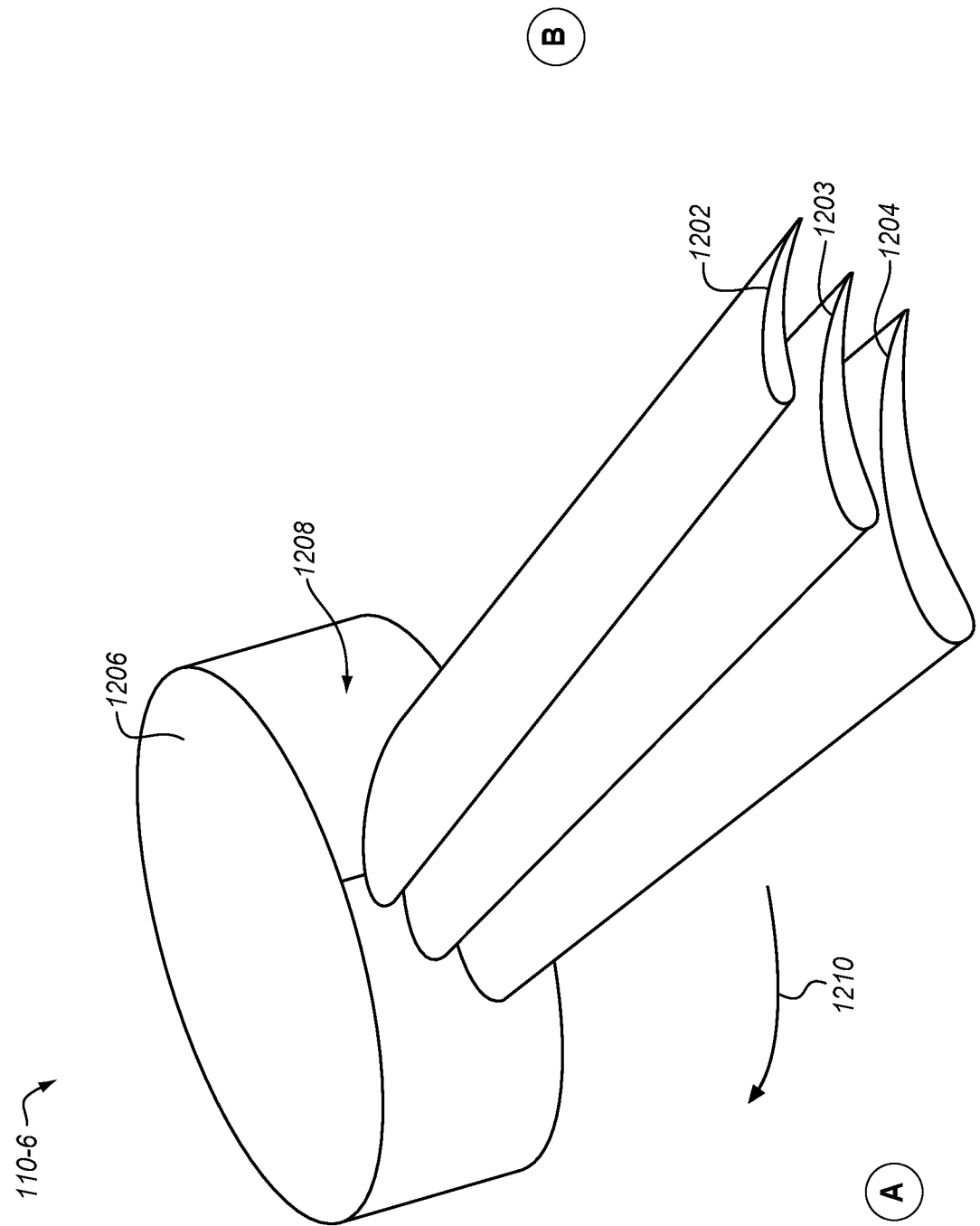
FIGS. 12-13 are isometric views of a rotor assembly depicting an illustrative embodiment of blade deployment.
Figure 13:
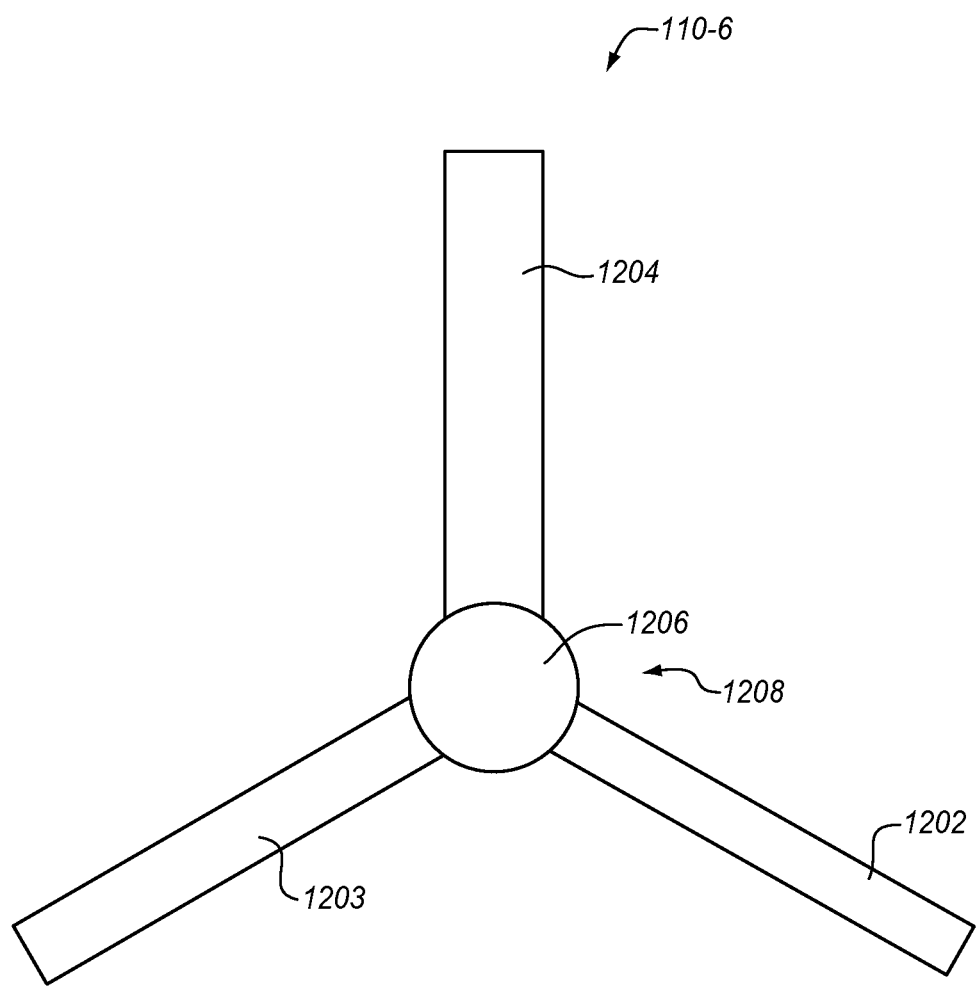

FIGS. 12-13 are isometric views of a rotor assembly 110-6 depicting an illustrative embodiment of blade deployment. In this embodiment, rotor assembly 110-6 includes a plurality of blades 1202-1204 that deploy from one side 1208 of a hub 1206. In this view, blades 1202-1204 are partially vertically aligned or stacked, as blades deploy in the direction of arrow 1210 into the configuration illustrated in FIG. 13. In one deployment example, blade 1202 is fixed, blade 1203 moves towards position A, and blade 1204 moves towards position A at a faster rate than blade 1203. In another example, blade 1202 moves towards position B, blade 1203 is fixed, and blade 1204 moves towards position A. In another example, blade 1202 moves towards position B, blade 1203 moves towards B at a slower rate than blade 1202, and blade 1204 is fixed.

Figure 14:
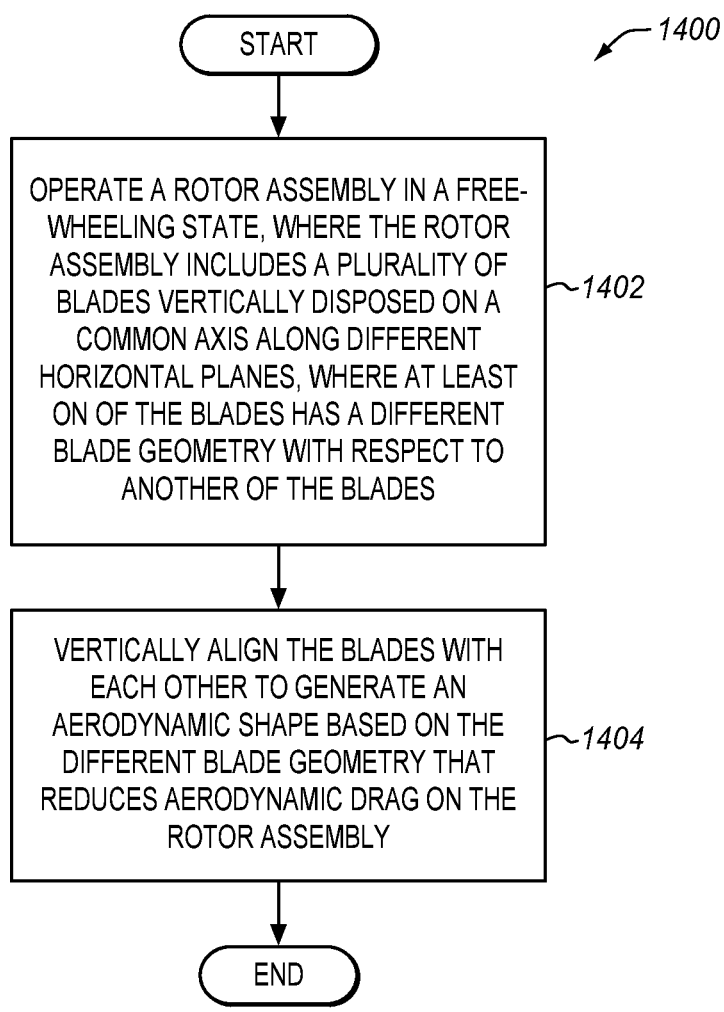
FIG. 14 is a flow chart of a method of operating a rotor assembly for aircraft in an illustrative embodiment.
Figure 15:
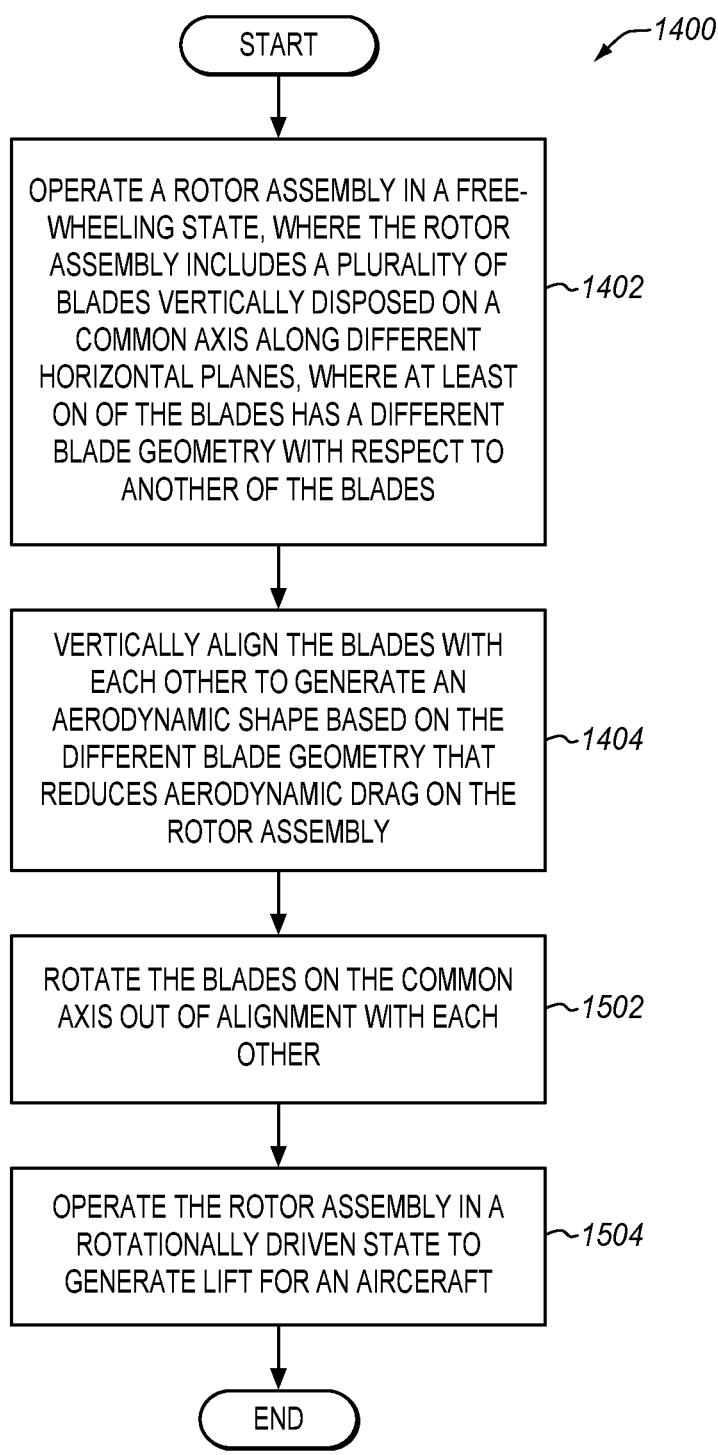
FIG. 15 is a flow chart depicting additional details of the method of FIG. 14 in an illustrative embodiment.

FIG. 14 is a flow chart of a method 1400 of operating a rotor assembly for aircraft in an illustrative embodiment, and FIG. 15 is a flow chart depicting additional details of method 1400 in an illustrative embodiment. The steps of method 1400 will be discussed with respect to rotor assembly 110, although method 1400 may apply to other rotor assemblies, not shown. The steps of method 1400 are not all inclusive, and may include other steps, not shown. Further, the steps may be performed in an alternate order.

During operation of aircraft 100, rotor assembly 110 may be placed in a free-wheeling state (see step 1402). For instance, aircraft 100 is in forward flight, lift is generated by wings 104-105, and rotor assembly 110 is not mechanically driven in rotation. Blades 306-307 (see FIG. 3) are vertically aligned with each other such that a collective shape of blades 306-307 is aerodynamic in shape, based on a difference between blade geometries 318-319, which reduces the aerodynamic drag on rotor assembly 110-1 (see step 1404, FIG. 4). For instance, modifications to blade geometry 318 and or blade geometry 319 (e.g., variations in the geometry of leading edges 308-309, trailing edges 310-311, blade tips 312-313, cambers 314-315, and/or chords 316-317 of blade 306 and/or blade 307) collectively form a more aerodynamic shape when blades 306-307 are vertically aligned or stacked.

Prior to aircraft 100 transitioning out of forward flight, rotor assembly 110-1 is operated to rotate blades 306-307 on common axis 402 out of alignment with each other (see FIG. 5 and, step 1502 of FIG. 15). Rotor assembly 110-1 is operated in a rotationally driven state to generate lift for aircraft 100 (see step 1504) to allow aircraft 100 to vertically land or hover.

The use of blade geometries 318-319 for blades 306-307 that differ from each other in rotor assembly 110 enables blades 306-307 in the stacked configuration to collectively achieve a more aerodynamic shape, thereby reducing the drag on aircraft 100. The reduced drag improves the performance of aircraft 100 during cruise.

Although specific embodiments were described herein, the scope is not limited to those specific embodiments. Rather, the scope is defined by the following claims and any equivalents thereof.

What is claimed is:

1. A method of operating a rotor assembly for aircraft, comprising:
    operating the rotor assembly in a free-wheeling state, the rotor assembly comprising one or more hubs configured to rotate on a common axis and a plurality of blades that extend radially from the one or more hubs with the blades disposed along different horizontal planes, wherein at least one of the blades has a different blade geometry with respect to another of the blades while producing the same thrust when driven in rotation; and
    vertically aligning the blades with each other such that a collective shape of the blades is aerodynamic in shape, based on the different blade geometry, that reduces aerodynamic drag on the rotor assembly.

2. The method of claim 1, further comprising:
    rotating the blades on the common axis out of alignment with each other; and
    operating the rotor assembly in a rotationally driven state to generate lift for the aircraft.

3. The method of claim 1, wherein:
    the plurality of blades includes a first blade disposed above a second blade when vertically aligned; and
    the first blade has a higher camber and a shorter chord than the second blade.

4. The method of claim 1, wherein:
the at least one of the blades has a chord that is different than another of the blades.

5. The method of claim 1, wherein:
the at least one of the blades has a camber that is different than another of the blades.

6. The method of claim 1, wherein:
the at least one of the blades has a chord and a camber that is different than another of the blades.

7. The method of claim 1, wherein:
the plurality of blades includes a first blade disposed above a second blade, and a third blade disposed below the second blade when vertically aligned;
the first blade has a higher camber and a shorter chord than the second blade; and
the second blade has a higher camber and a shorter chord than the third blade.

8. A rotor assembly for aircraft, the rotor assembly comprising:
one or more hubs configured to rotate on a common axis, and a plurality of blades that extend radially from the one or more hubs with the blades disposed along different horizontal planes,
wherein the blades are configured to vertically align with each other when the rotor assembly is free-wheeling, and to rotate on the common axis out of alignment with each other when the rotor assembly is driven in rotation,
wherein at least one of the blades has a different blade geometry with respect to another of the blades while producing the same thrust when driven in rotation, such that a collective shape of the blades is an aerodynamic shape, based on the different blade geometry, that reduces aerodynamic drag on the rotor assembly when the blades are vertically aligned with each other.

9. The rotor assembly of claim 8, wherein:
the plurality of blades includes a first blade disposed above a second blade when vertically aligned; and
the first blade has a higher camber and a shorter chord than the second blade.

10. The rotor assembly of claim 8, wherein:
the at least one of the blades has a chord that is different than another of the blades.

11. The rotor assembly of claim 8, wherein:
the at least one of the blades has a camber that is different than another of the blades.

12. The rotor assembly of claim 8, wherein:
the at least one of the blades has a chord and a camber that is different than another of the blades.

13. The rotor assembly of claim 8, wherein:
the plurality of blades includes a first blade disposed above a second blade, and a third blade disposed below the second blade when vertically aligned;
the first blade has a higher camber and a shorter chord than the second blade; and
the second blade has a higher camber and a shorter chord than the third blade.

14. An aircraft, comprising:
at least one rotor assembly configured to provide lift for the aircraft, the at least one rotor assembly comprising:
one or more hubs configured to rotate on a common axis;
a first blade and a second blade that extend radially from the one or more hubs and are disposed along different horizontal planes,
wherein the first blade and the second blade form a vertically stacked configuration when the rotor assembly is free-wheeling, and bloom out of the vertically stacked configuration when the rotor assembly is driven in rotation to generate the lift,
wherein the first blade has a different blade geometry with respect to the second blade while producing the same thrust when driven in rotation.

15. The aircraft of claim 14, wherein:
the first blade is disposed above the second blade in the vertically stacked configuration; and
the first blade has a higher camber and a shorter chord than the second blade.

16. The aircraft of claim 14, wherein:
the first blade has a chord that is different than the second blade.

17. The aircraft of claim 14, wherein:
the first blade has a camber that is different than the second blade.

18. The aircraft of claim 14, further comprising:
a third blade that extends radially from the one or more hubs and is disposed along a different horizontal plane than the first blade and the second blade;
wherein the first blade, the second blade, and the third blade form the vertically stacked configuration when the rotor assembly is free-wheeling, and bloom out of the vertically stacked configuration when the rotor assembly is driven in rotation to generate the lift; and
wherein the third blade has a different blade geometry with respect to the first blade and the second blade while producing the same thrust when driven in rotation.

19. The aircraft of claim 18, wherein:
the first blade is disposed above the second blade, and the second blade is disposed above the third blade in the vertically stacked configuration;
the first blade has a higher camber and a shorter chord than the second blade; and
the second blade has a higher camber and a shorter chord than the third blade.

20. The aircraft of claim 14, wherein:
the first blade has a chord and a camber that is different than the second blade.

* * * * *